US009672139B2

(12) United States Patent
Peng

(10) Patent No.: US 9,672,139 B2
(45) Date of Patent: Jun. 6, 2017

(54) DEBUGGING IN A PRODUCTION ENVIRONMENT

(71) Applicant: SuccessFactors, Inc., So. San Francisco, CA (US)

(72) Inventor: Yang Peng, Shanghai (CN)

(73) Assignee: SUCCESSFACTORS, INC., South San Francisco, CA (US)

( * ) Notice: Subject to any disclaimer, the term of this patent is extended or adjusted under 35 U.S.C. 154(b) by 72 days.

(21) Appl. No.: 14/805,244

(22) Filed: Jul. 21, 2015

(65) Prior Publication Data

US 2017/0024307 A1 Jan. 26, 2017

(51) Int. Cl.
*G06F 9/44* (2006.01)
*G06F 9/45* (2006.01)
(Continued)

(52) U.S. Cl.
CPC ...... *G06F 11/3664* (2013.01); *G06F 11/3636* (2013.01); *G06F 11/3688* (2013.01);
(Continued)

(58) Field of Classification Search
CPC .. G06F 11/263; G06F 11/3692; G06F 11/362; G06F 11/3632; G06F 11/366; G06F 11/3636; G06F 11/079; G06F 11/3684; G06F 11/3414; G06F 11/3676; G06F 11/3672; G06F 11/3688; G06F 11/36; G06F 11/3664; G06F 17/3051; G06F 17/30;
(Continued)

(56) References Cited

U.S. PATENT DOCUMENTS 6,928,328 B2 * 8/2005 Deitz .................. G06F 21/64
700/86
6,964,044 B1 * 11/2005 Hudson .................. G06F 8/71
709/203

(Continued)

OTHER PUBLICATIONS

Kapil Saxena et al., Testing in Production: The Future of Testing, 2014, [Retrieved on Nov. 22, 2016]. Retrieved from the internet: <URL: https://www.globallogic.com/wp-content/uploads/2013/06/Testing-in-Production.pdf> 6 Pages. (1-6).*

(Continued)

*Primary Examiner* — Thuy Dao
*Assistant Examiner* — Anibal Rivera
(74) *Attorney, Agent, or Firm* — Fountainhead Law Group P.C.

(57) ABSTRACT

Systems and methods for debugging in a production environment are disclosed. An example method includes first receiving, by a processor, a user request from a development environment to execute a debugging program in a production environment, wherein the production environment is inaccessible by the development environment. The method then approves, by the processor, the execution of the debugging program in the production environment by seeking approval from at least one member from the production environment and the development environment. The method then in response to the approving, transmitting, by the processor, a communication to the production environment to cause the debugging program to be executed in the production environment.

14 Claims, 4 Drawing Sheets

(51) Int. Cl.
*G06F 11/36* (2006.01)
*H04L 29/08* (2006.01)
*G06F 11/34* (2006.01)
*G06F 9/445* (2006.01)

(52) U.S. Cl.
CPC .............. *H04L 67/28* (2013.01); *G06F 8/65* (2013.01); *G06F 11/3409* (2013.01); *G06F 11/3632* (2013.01)

(58) Field of Classification Search
CPC ..... G06F 8/61; G06F 8/71; G06F 8/36; G06F 8/60; G06F 8/65; G06F 8/20; G06F 8/10; G06F 8/751; G06F 21/305; G06F 9/44; G06F 9/445; G06F 17/30914; G06F 11/368; G06F 11/3006; G06F 11/3409; G06F 11/008; G06F 21/64; G06F 21/12
See application file for complete search history.

(56) References Cited

U.S. PATENT DOCUMENTS

| | | | | |
|---|---|---|---|---|
| 7,072,954 B1* | 7/2006 | Ezaki | ............... | H04L 41/28 370/230 |
| 7,296,256 B2* | 11/2007 | Liu | ............... | G06Q 10/04 717/104 |
| 7,937,685 B2* | 5/2011 | Weil | ............... | G06F 8/71 705/323 |
| 8,001,422 B1* | 8/2011 | Sun | ............... | G06F 11/263 714/25 |
| 8,015,201 B1* | 9/2011 | Harris | ............... | G06F 11/079 707/769 |
| 8,230,325 B1* | 7/2012 | Sun | ............... | G06F 17/30914 715/229 |
| 8,560,819 B2* | 10/2013 | Fillipi | ............... | G06F 9/44 709/220 |
| 8,677,315 B1* | 3/2014 | Anderson | ............... | G06F 8/60 717/101 |
| 8,819,617 B1* | 8/2014 | Koenig | ............... | G06F 11/3664 717/101 |
| 8,978,104 B1* | 3/2015 | Wilkinson | ............... | G06F 21/305 709/217 |
| 8,990,778 B1* | 3/2015 | Allocca | ............... | G06F 11/3692 717/126 |
| 9,219,611 B1* | 12/2015 | Naik | ............... | H04L 9/3247 |
| 2002/0069099 A1* | 6/2002 | Knox | ............... | G06Q 10/0631 705/7.12 |
| 2003/0182652 A1* | 9/2003 | Custodio | ............... | G06F 8/61 717/122 |
| 2003/0192029 A1* | 10/2003 | Hughes | ............... | G06F 8/20 717/101 |
| 2004/0117759 A1* | 6/2004 | Rippert, Jr. | ............... | G06F 8/20 717/100 |
| 2004/0123268 A1* | 6/2004 | Lundberg | ............... | G06F 8/71 717/103 |
| 2004/0199629 A1* | 10/2004 | Bomer | ............... | G06F 11/362 709/224 |
| 2004/0261053 A1* | 12/2004 | Dougherty | ............... | G06F 8/20 717/101 |
| 2005/0050479 A1* | 3/2005 | Bogdan | ............... | G06F 8/20 716/102 |
| 2005/0114839 A1* | 5/2005 | Blumenthal | ............... | G06F 11/3672 717/124 |
| 2005/0246207 A1* | 11/2005 | Noonan | ............... | G06F 11/3409 705/4 |
| 2006/0184918 A1* | 8/2006 | Rosaria | ............... | G06F 11/3672 717/124 |
| 2006/0282816 A1* | 12/2006 | Chen | ............... | G06Q 10/06 717/101 |
| 2007/0094532 A1* | 4/2007 | Sengupta | ............... | G06F 11/3632 714/5.1 |
| 2008/0178154 A1* | 7/2008 | Basler | ............... | G06F 8/20 717/124 |
| 2008/0244555 A1* | 10/2008 | Welvaert | ............... | G06F 8/65 717/169 |
| 2009/0150396 A1* | 6/2009 | Elisha | ............... | G06F 17/3051 |
| 2009/0164970 A1* | 6/2009 | Gentry | ............... | G06F 8/71 717/101 |
| 2009/0199160 A1* | 8/2009 | Vaitheeswaran | ............... | G06F 11/3414 717/124 |
| 2009/0288078 A1* | 11/2009 | Makonahalli | ............... | G06F 8/60 717/174 |
| 2009/0300580 A1* | 12/2009 | Heyhoe | ............... | G06F 8/71 717/106 |
| 2010/0095246 A1* | 4/2010 | Shepherd | ............... | G06Q 30/06 715/835 |
| 2010/0281458 A1* | 11/2010 | Paladino | ............... | G06F 8/71 717/106 |
| 2011/0047415 A1* | 2/2011 | Nanjundaswamy | ............... | G06F 11/3636 714/37 |
| 2011/0107302 A1* | 5/2011 | Du | ............... | G06F 8/10 717/121 |
| 2011/0145795 A1* | 6/2011 | Khanapurkar | ............... | G06F 11/3414 717/126 |
| 2011/0154101 A1* | 6/2011 | Merwe | ............... | G06F 11/3006 714/5.1 |
| 2011/0154135 A1* | 6/2011 | Tyhurst | ............... | G06F 8/61 714/57 |
| 2011/0209121 A1* | 8/2011 | Nagata | ............... | G06F 11/3688 717/124 |
| 2011/0258579 A1* | 10/2011 | Nanjundaswamy | ............... | G06F 11/362 715/810 |
| 2011/0296371 A1* | 12/2011 | Marella | ............... | G06Q 10/06 717/101 |
| 2011/0314439 A1* | 12/2011 | Colgrave | ............... | G06Q 10/06 717/101 |
| 2012/0023483 A1* | 1/2012 | Welchman | ............... | G06F 11/3676 717/125 |
| 2012/0102462 A1* | 4/2012 | Kushneryk | ............... | G06F 11/3688 717/124 |
| 2012/0131555 A1* | 5/2012 | Hossain | ............... | G06F 11/362 717/124 |
| 2012/0266136 A1* | 10/2012 | Brown | ............... | G06F 11/3664 717/124 |
| 2012/0291014 A1* | 11/2012 | Shrinivasan | ............... | G06F 11/3664 717/124 |
| 2012/0331519 A1* | 12/2012 | Yu | ............... | G06F 21/12 726/1 |
| 2013/0152047 A1* | 6/2013 | Moorthi | ............... | G06F 11/368 717/124 |
| 2013/0167108 A1* | 6/2013 | Shukla | ............... | G06F 8/65 717/101 |
| 2013/0174126 A1* | 7/2013 | Belihomji | ............... | G06F 11/3688 717/127 |
| 2014/0026122 A1* | 1/2014 | Markande | ............... | G06F 11/3688 717/124 |
| 2014/0058797 A1* | 2/2014 | Roy | ............... | G06Q 10/08 705/7.36 |
| 2015/0058460 A1* | 2/2015 | Seago | ............... | H04L 41/28 709/223 |
| 2015/0082281 A1* | 3/2015 | Koenig | ............... | G06F 11/008 717/124 |
| 2015/0082286 A1* | 3/2015 | Gittelman | ............... | G06F 11/3676 717/130 |
| 2015/0120844 A1* | 4/2015 | Adler | ............... | H04L 51/14 709/206 |
| 2015/0142367 A1* | 5/2015 | Yurach | ............... | G06F 19/3412 702/123 |
| 2015/0143344 A1* | 5/2015 | Davis | ............... | G06F 8/751 717/129 |
| 2015/0268951 A1* | 9/2015 | Wang | ............... | G06Q 10/06 717/103 |
| 2015/0269064 A1* | 9/2015 | Bishop | ............... | G06F 11/3684 717/124 |
| 2015/0347970 A1* | 12/2015 | Kirtane | ............... | G06F 11/3664 717/103 |

(56) References Cited

U.S. PATENT DOCUMENTS

2016/0124835 A1\* 5/2016 Davis ............... G06F 11/366
714/38.1
2016/0170863 A1\* 6/2016 Finnie ............... G06F 11/3664
717/131
2016/0267025 A1\* 9/2016 Makineedi ......... G06F 12/1458

OTHER PUBLICATIONS

Marc van't Veer, What is testing in production and why should it be performed?, 2012, [Retrieved on Mar. 14, 2017]. Retrieved from the internet: <URL: https://www.polteq.com/wp-content/uploads/2013/02/testingexperience20_12_12_Marc_van_t_Veer.pdf> 4 Pages (48-51).*

Amitabh Srivastava et al., Efficient Integration Testing using Dependency Analysis, 2005, [Retrieved on Mar. 14, 2017]. Retrieved from the internet: <URL: https://www.microsoft.com/en-us/research/wp-content/uploads/2016/02/tr-2005-94.pdf> 9 Pages (1-9).*

\* cited by examiner

DEBUGGING IN A PRODUCTION ENVIRONMENT

BACKGROUND

Debugging in a production environment is advantageous. First of all, a support team can dive into a potential defect right away with little preparation efforts. As a result, a defect may be detected and removed at the soonest opportunity, thereby significantly improving system performance.

Second of all, debugging in the same environment where a potential defect resides reduces or eliminates uncertainties inherently associated with debugging in a simulated—but different—environment. Because setting up a simulated environment may introduce other factors that were not present in the production environment, thereby complicating the debugging efforts. For example, a network performance difference between a production environment and a simulated environment may lead to an incorrect conclusion that a system failure was network performance related, when it was not.

Difficulties abound for debugging in a production environment, however. One technical problem is that, sometimes, production data are quite large in size and thus cannot be duplicated for debugging purpose without significant efforts. For example, replicating an entire enterprise database in order to debug an enterprise data processing application can be quite time- and resource-consuming and thus in some cases simply not possible.

Another technical problem is that, in some other cases, corporate data access control policies prohibit access to production data by outside development teams, even for testing and debugging purposes. As a result, an outside support team cannot even access a production environment, let alone running test cases and debugging errors.

There is therefore a need for improved techniques to debug in a production environment.

SUMMARY

In one embodiment, a computer-implemented method first receives, by a processor, a user request from a development environment to execute a debugging program in a production environment, wherein the production environment is inaccessible by the development environment, approves, by the processor, the execution of the debugging program in the production environment by seeking approval from at least one member from the production environment and the development environment, and in response to the approving, transmits, by the processor, a communication to the production environment to cause the debugging program to be executed in the production environment.

In another embodiment, a non-transitory computer readable storage medium stores one or more programs comprising instructions for: first receiving, by a processor, a user request from a development environment to execute a debugging program in a production environment, wherein the production environment is inaccessible by the development environment, approving, by the processor, the execution of the debugging program in the production environment by seeking approval from at least one member from the production environment and the development environment, and in response to the approving, transmitting, by the processor, a communication to the production environment to cause the debugging program to be executed in the production environment.

In another embodiment, a computer implemented system comprises one or more computer processors memory; and one or more programs. The one or more programs are stored in the memory and configured to be executed by the one or more processors. The one or more programs include instructions for: first receiving, by a processor, a user request from a development environment to execute a debugging program in a production environment, wherein the production environment is inaccessible by the development environment, approving, by the processor, the execution of the debugging program in the production environment by seeking approval from at least one member from the production environment and the development environment, and in response to the approving, transmitting, by the processor, a communication to the production environment to cause the debugging program to be executed in the production environment.

The following detailed description and accompanying drawings provide a better understanding of the nature and advantages of the present disclosure.

DETAILED DESCRIPTION

Figure 1:
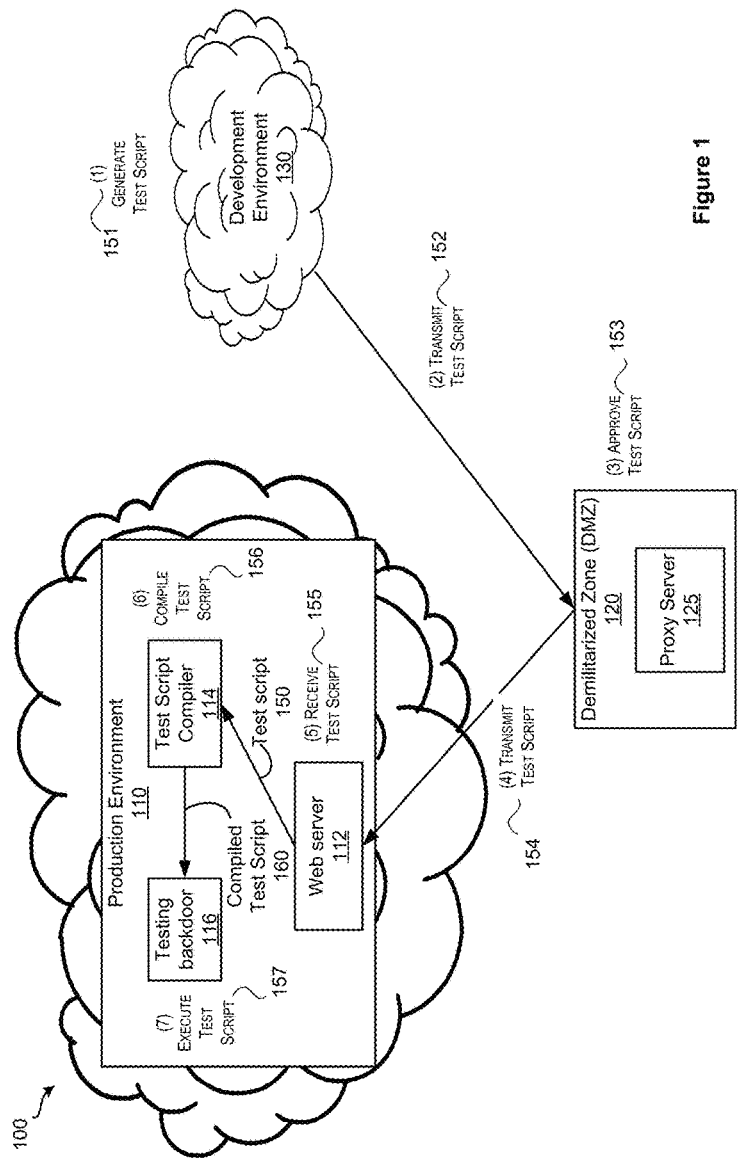
FIG. 1 is an example block diagram illustrating a computing system for debugging in a production environment, in accordance with one embodiment.

Described herein are techniques for debugging in a production environment. The apparatuses, methods, and techniques described below may be implemented as a computer program (software) executing on one or more computers. The computer program may further be stored on a non-transitory computer readable medium, such as a memory or disk, for example. A computer readable medium may include instructions for performing the processes described below. In the following description, for purposes of explanation, numerous examples and specific details are set forth in order to provide a thorough understanding of various aspects of the present disclosure. It will be evident, however, to one skilled in the art that embodiments of the present disclosure as defined by the claims may include some or all of the features in these examples alone or in combination with other features described below, and may further include modifications and equivalents of the features and concepts described herein.

The implementations described herein provide various technical solutions to debug in a production environment, and in particular to the above-identified technical problems.

One example set forth below may use a proxy server to pick up debugging programs from a testing server, and execute, via the proxy server, the debugging programs on a production server. The proxy server has access to the test server—but not vice versa, in order to ensure data security on the production server.

Introductory Example

As a non-limiting example, after a testing engineer prepares a testing script within a development environment, a server within the development environment can prepare (e.g., compile) the testing script for execution within a production environment. The development environment, however, does not have direct access to the production environment so as to ensure data security. As a result, servers within the development environment cannot communicate with servers within the production environment.

After the testing script is prepared, a proxy server picks up the testing script and executes the testing script within the production environment. Note that although the proxy server can access particular types of data (e.g., the testing script) stored within the development environment, the development environment does not have data access to the proxy server. In other words, the access between the proxy server and the development environment is a one way access—by the proxy server to the development environment, but not vice versa. This ensures members of the development environment cannot execute scripts/programs within the production environment without express authorizations, as controlled and enforced by a proxy server and security policies embodied thereon. Other advantages can include sandboxing the production environment, thus preventing data within the production environment from being accessed by members outside the production environment.

By these ways, members of the development environment such as testers and developers can debug programs being executed in the production environment without having to replicate a production database or a significant portion thereof (which is often both time- and resource-consuming). Also, because all programs executions are carried out and monitored through a proxy server, data integrity in the production environment can be assured.

Additional Details of Embodiments

Additional details of implementations are now described in relation to the figures.

FIG. 1 is an example block diagram illustrating a computing system for debugging in a production environment, in accordance with one embodiment. As shown, system 100 includes production environment 110, demilitarized zone 120, and development environment 130. Development environment 130 can include one or more servers that are configured to generate one or more programs. Members within development environment 130 can develop the programs and periodically, release software updates for the programs. In some examples, development environment 130 can be computers and servers that belong to a software company whose purpose is to provide software programs to its customers. The software programs can be developed within product environment 130. Production environment 110 can be a collection of computers and servers that belong to a customer of development environment 130. The computers and servers can store datasets and programs to perform functions on the data. The programs can be provided by development environment 130 while the datasets can be unique to production environment 110. The dataset within production environment 110 can have its own unique structures or can be confidential. Members of production environment 110 can utilize the programs to perform functions which manipulate the dataset.

Periodically, members of production environment 110 can discover software bugs (e.g., issues) with a program provided by development environment 130. The software bug can be the generation of inaccurate or undesirable results for a dataset of production environment 110. As a result, a member of the production environment 110 can report the software bug to development environment 130. Members within development environment 130 can be responsible for fixing the software bug. In some instances the software bug can be unique to the dataset of production environment 110 and thus cannot be reproduced without providing members of development environment 130 access to the dataset within production environment 110. However, copying the dataset from production environment 110 to development environment 130 can be a time consuming and lengthy process, particularly when the dataset is large or when the dataset includes data structures which do not exist within development environment 130. Moreover, some customer may not desire confidential information which resides within the dataset to be copied from production environment 110. As a result, system 100 can include demilitarized zone 120 to ensure that the production environment 110 does not communicate directly with the development environment 130. Similarly, demilitarized zone 120 can ensure that development environment 130 does not communicate directly with production environment 110. Any communication shared between production environment 110 and development environment 130 can require prior authorization by demilitarized zone 120.

Demilitarized zone 120 is configured to manage communications or data transmission between production environment 110 and development environment 130. In one embodiment, demilitarized zone 120 can receive test scripts from development environment 130. A test script contains instructions to test one or more features or functionalities of the program. The test script can be executed on an instance of the program within development environment 130 (development instance) or an instance of the program within production environment 110 (e.g., production instance). A member of the development environment 130 may require access to datasets within production environment 110 to reproduce and troubleshoot the software bug. However, datasets within production environment 110 can be confidential and thus access to the datasets can be limited to members of production environment 110. Demilitarized zone 120 can alleviate this issue by providing a gateway where communications and data transmission between production environment 110 and development environment 130 can be examined prior to reaching its destination.

Demilitarized zone 120 can include proxy server 125. Proxy server 125 can be configured to perform one or more checks before allowing data transmission or communications to be forwarded to production environment 110. Advantages of these additional checks before communications or data is transmitted to production environment 110 include improved security within production environment 110. The checks can include predefined conditions. Demilitarized zone 120 can check whether predefined conditions are satisfied. In one embodiment, demilitarized zone 120 can forward a test script from development environment 130 to production environment 110 indirectly through demilitarized zone 120 once one or more conditions have been satisfied. This allows members of the development environment 130 to troubleshoot the software bugs by running test scripts within production environment 110. Production environment 110 can remain secure since members of the development environment 130 do not have direct access to the production program instance. In some embodiments, the conditions can include approvals from one or more members within system 100. For example, the conditions can include receiving approval from one or more members within development environment 130 that ensure the test script will not change datasets within production environment 110, will not impact the operation perspective of production environment 110, and/or has been approved by a customer contact of production environment 110.

Production environment 110 can include web server 112, test script compiler 114, and testing backdoor 116. Web server 112 can be configured to securely communicate with demilitarized zone 120. In one embodiment, the communication can be via HTTP protocol or a form of secure communication between web server 112 and demilitarized zone 120. In one embodiment, development environment 130 may transmit test scripts indirectly to production environment 110 via the communication between webs server 112 and demilitarized zone 120. Test script compiler 114 is configured to compile the test script once the test script has been received. In one embodiment, test script compiler 114 can receive an uncompiled test script from web server 112 and compile the test script. Compiling the test script within production environment 110 can have certain advantages such as minimizing the load on development environment 130 and ensuring that the compiled test script can execute on the production environment 110. In some instances, compiling the test script in the same environment in which the test script is going to be executed can ensure that the compiled test script will execute. Testing backdoor 116 is configured to monitor test script compiler 114. When testing backdoor 116 detects that a compiled test script is ready, testing backdoor 116 can execute the compiled test script on a production instance within production environment 110. Once testing backdoor 116 has executed the testing script, the results of the testing script can be routed back through the same channels until the testing results reach development environment. In one example, testing results would travel from testing backdoor 116 to web server 112 to demilitarized zone 120 and finally to the development environment 130 where the engineer or member of the development environment can analyze the test results.

As shown here, the process can begin in the development environment 130 where a member of the development environment 130 generates a test script at step (1) (reference numeral 151). After the test script has been generated, the development environment 130 can transmit the test script to the demilitarized zone 120 at step 152. The demilitarized zone 120 can in turn await approval of the test script at step (3) (reference numeral 153). In one example, proxy server 125 can transmit communications to one or more members of development environment 130 or production environment 110 to seek approval for the execution of the test script within production environment 110. Once the test script has been approved, demilitarized zone 120 can transmit the test script to web server 112 in production environment 110 at step (4) (reference numeral 154). The transmission of the test script can be through a secure communication channel, such as HTTP.

Web server 112 can receive the test script and transmit the test script to test script compiler 114. Test script compiler 114 can compile the test script at step (6) (reference numeral 156). Testing backdoor 116 can monitor test script compiler 114 for compiled test scripts. Once a compiled test script is detected, testing backdoor 116 can execute the compiled test script at step (7) (reference numeral 157). Execution of the compiled test script can include retrieving the compiled test script from test script compiler 114 and assigning the compiled test script to a production instance within production environment 110 for execution. Once execution of the compiled test script has completed, the production instance can return the results to development environment 130. Returning the results can include testing backdoor 116 collecting the results of the testing script, testing backdoor 116 transmitting the results to web server 112, and web server 112 returning the results to development environment 130 via demilitarized zone 120. In one embodiment, demilitarized zone 120 can be automatically forward the results to development environment. In another embodiment, demilitarized zone 120 can forward the results to development environment 130 after one or more conditions are met. For example, proxy server 125 can wait for approval from production environment 110 before transmitting the test results to development environment 130. For instance, a manager within production environment 110 can examine the test results to determine whether confidential information is in the test results. Proxy server 125 can transmit the test results to the development environment 130 only after approval has been received from the manager of the production environment 130. This can provide an additional layer of security to ensure that confidential information within the production environment 110 is not being distributed outside of production environment 110 through the test results of the testing script.

Figure 2:
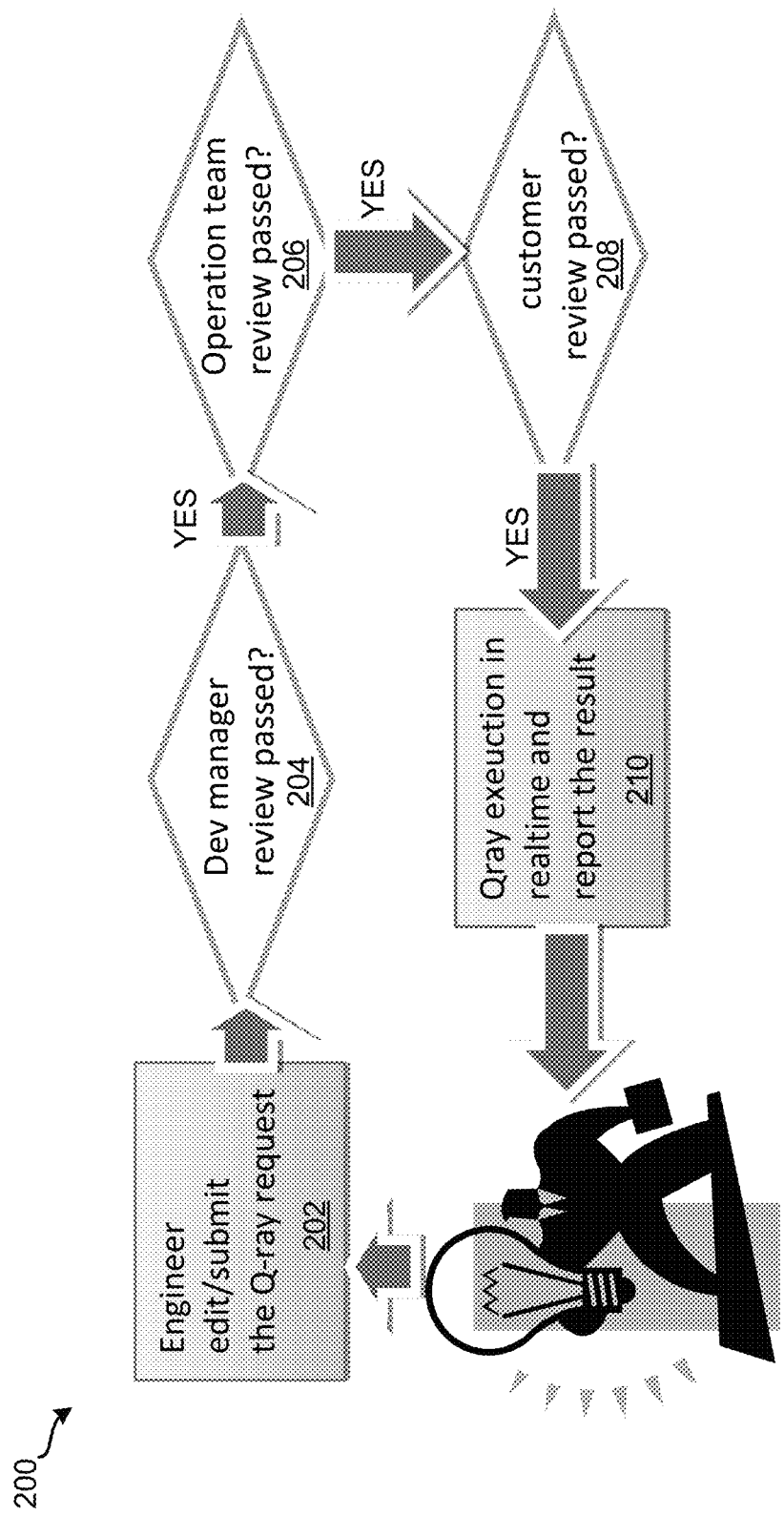
FIG. 2 illustrates a process for executing a test script originating from a development environment within a production environment in accordance with to one embodiment.

FIG. 2 illustrates a process for executing a test script originating from a development environment within a production environment according to one embodiment. Process 200 can be executed by a system such as system 100 of FIG. 1. Process 200 begins with an engineer submitting a test script in the form of a q-ray request. For example, an engineer within the development environment can generate a test script. The test script can be used to test an issue with a program provided by the development environment. The developer may desire to run the test script within the production environment so that the developer can reproduce the issue experienced within the production environment. Members of the production environment may also desire to run the test script within the production environment so that the developer do not have access to confidential data within the production environment. Once the test script has been generated, process 200 can continue with the engineer submitting the test script from the development environment to a demilitarized zone at step 202. Once the demilitarized zone has received the test script, the demilitarized zone can check whether one or more conditions have been satisfied. Here, the demilitarized zone can first contact a development manager of the production environment to review the test script at 204. Upon completing the review, the development manager may approve or deny having the test script being run in the production environment.

If the test script passes the development manager's review, process 200 can continue with a test script review with the operation team at 206. The demilitarized zone can contact one or more members of the operational team to review the test script. The operational team may be part of the production environment or the development environment. Based on the review, the member(s) of the operational team may approve or deny the test script from being run in the development environment. If the test script passes the operations team review, process 200 can continue with a customer (e.g., the production environment) review at step 208. To perform the customer review, the demilitarized zone can transmit the test script to a member of the production environment that is responsible for reviewing test script requests from the development environment. In one embodiment, failing a review can result in subsequent reviews not being performed and the rejection of the test script. For example, the demilitarized zone can initiate a subsequent review in the chain of people once previous reviews have passed. In another embodiment, the demilitarized zone can initiate all reviews simultaneously. The results of the reviews can be received and analyzed. If any of the reviews have failed, then the demilitarized zone can reject the test script. If all of the reviews have passed, then the test script can be transmitted to the production environment for execution.

If the reviews have passed, process 200 can continue with the demilitarized zone initiating the test script execution at step 210. Initiation of the test script execution can include transmitting the test script to the production environment for execution. In one embodiment, the test script can be executed in real time. Once the test script has been executed, the results can be received by the demilitarized zone and reported out to the developer. The developer can in turn analyze the results to determine the root of the issue.

Figure 3:
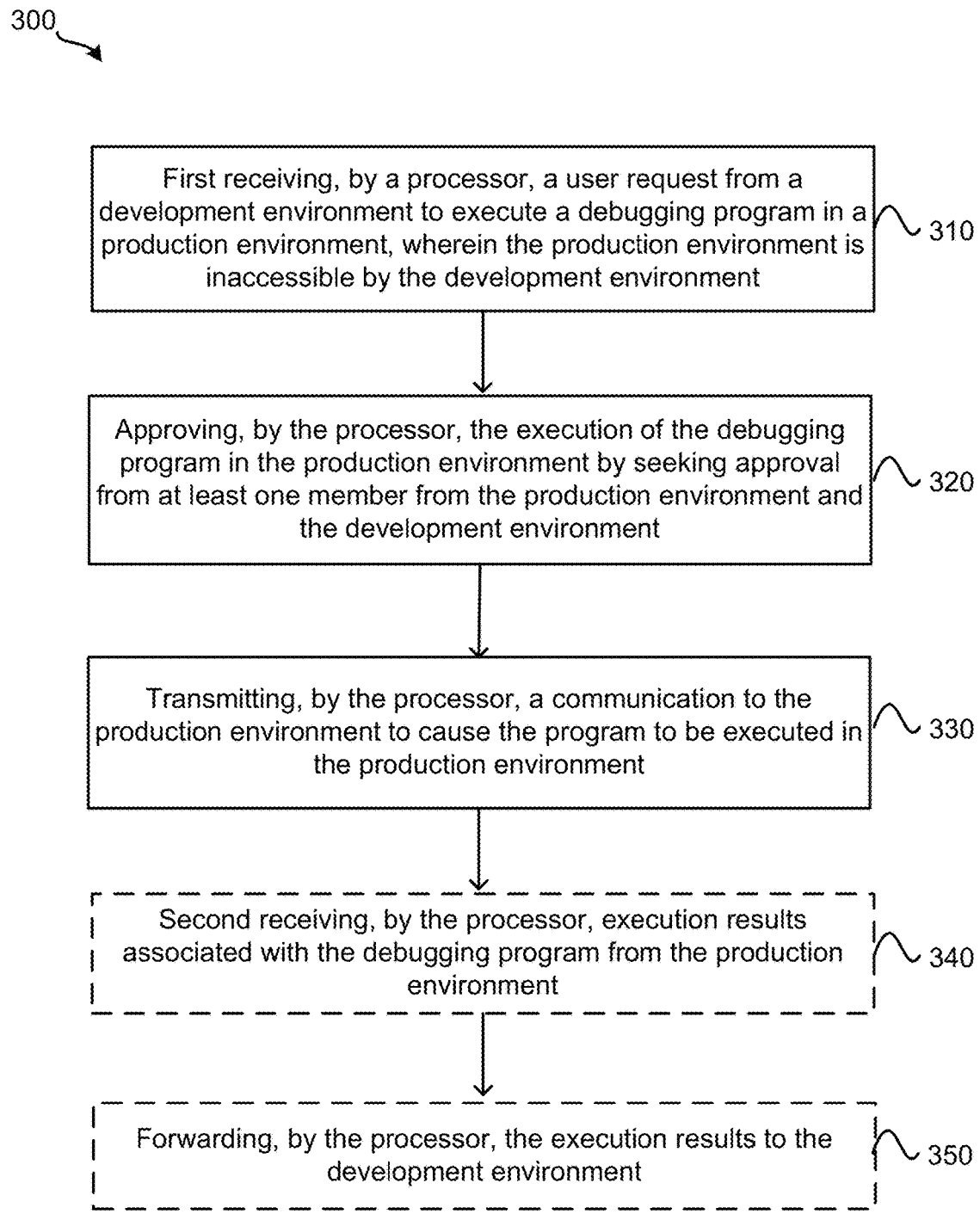
FIG. 3 is an example flow chart illustrating a method for debugging in a production environment, in accordance with one embodiment.

FIG. 3 is an example flow chart illustrating a process for debugging in a production environment, in accordance with one embodiment. In one embodiment, process 300 is implemented within a computer system, such as proxy server 125 shown in FIG. 1. In one embodiment, the computer system is equipped with one or more processors and memory storing one or more programs for execution by the one or more processors. Process 300 begins by first receiving a user request from a development environment to execute a debugging program in a production environment, wherein the production environment is inaccessible by the development environment at 310. The debugging program can be a test script. The test script can be generated by a member of the development environment to resolve an issue with a software program running in the production environment. The software program may have been provided by the development environment. An instance of the software program can be provided for execution in the production environment. In one example, the production environment is inaccessible by the development environment. Inaccessibility can include the inability to run debugging programs or transmit debugging programs in the production environment. Inaccessibility can also include the inability to access datasets within the production environment. The production environment can be a software environment belonging to a customer where an instance of a software program is being executed. The development environment can be a software environment belonging to an organization who develops the software program. The user request can include the debugging program. Alternatively the debugging program can be already available awaiting execution.

After receiving the user request, process 300 can continue by approving the execution of the debugging program in the production environment by seeking approval from at least one member from the production environment and the development environment at 320. The approval(s) can come from one or more members of the production environment. Alternatively, the approval(s) can come from one or more members of the development environment. Alternatively, there can be multiple approvals, some from the production environment and some from the development environment. One or more members of the production environment or development environment can review the debugging program to determine whether the debugging program meets one or more conditions before execution within the production environment. The conditions can check whether the debugging program alters datasets within the production environment, transmits data outside the programming environment, or transmits data into the programming environment.

In one embodiment, process 300 can automate the approval seeking process by running scripts to check for the conditions. For example, a script can check the debugging program for instructions which add, edit, or otherwise modify the datasets within the production environment. Another script can check the debugging program for instructions which write out data from datasets within the production environment. In another embodiment process 300 can include some manual approvals and some automated approvals which are performed using scripts. Conditions which are simpler to check can be automated while conditions which are more difficult to check can be performed manually by a member of the development or production environment.

After approving the execution of the debugging program, process 300 can continue by transmitting a communication to the production environment to cause the debugging program to be executed in the production environment at 330. The communication can include the debugging program. In other examples, the debugging program can be stored within the production environment awaiting execution. In one embodiment, the debugging program can be transmitted in the communication to a web server within the production environment. The web server can transmit the debugging program to a test script compiler to compile the debugging program. A testing backdoor of the production environment can subsequently execute the compiled debugging program in the production environment. During execution of the compiled debugging program, an output file can be generated containing the results or a byproduct of the debugging program.

After transmitting the communication, process 300 can optionally second receive execution results associated with the debugging program from the production environment at 340. The execution results can include the output file generated above. After optionally receiving execution results, process 300 can optionally forward the execution results associated with the program from the production environment at 350. The execution results can be forwarded to the development environment. Once received by the development environment, the execution results can be analyzed by a member of the development environment. The member can be the same member who submitted the user request.

Figure 4:
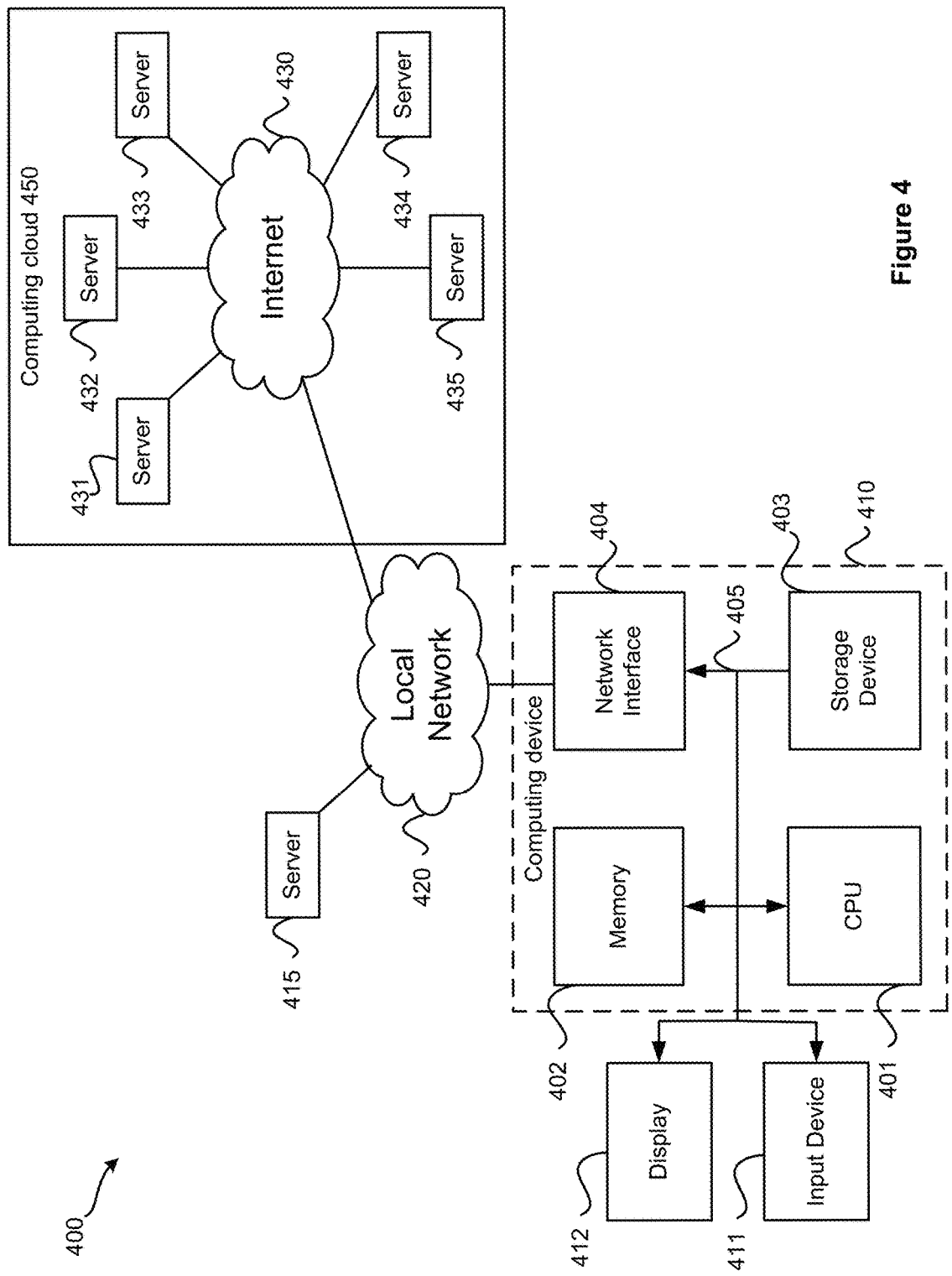
FIG. 4 is an example block diagram illustrating an example computing system for debugging in a production environment, in accordance with one embodiment.

FIG. 4 is an example block diagram illustrating an example computing system for debugging in a production environment, in accordance with one embodiment.

As shown in FIG. 4, in one embodiment, the computing system 410 includes a bus 406 or other communication mechanism for communicating information, and a processor 401 coupled with the bus 405 for processing information. In one embodiment, the computing system 410 also includes a memory 402 coupled to bus 406 for storing information and instructions to be executed by processor 401, including information and instructions for performing the techniques described above, for example. In one embodiment, the memory 402 may also be used for storing variables or other intermediate information during execution of instructions to be executed by processor 401. In one embodiment, the memory 402 includes, but is not limited to, random access memory (RAM), read only memory (ROM), or both. A storage device 403 is also provided for storing information and instructions. Common forms of storage devices include, for example, a hard drive, a magnetic disk, an optical disk, a CD-ROM, a DVD, a flash memory, a USB memory card, or any other medium from which a computing system can obtain information. In one embodiment, the storage device 403 may include source code, binary code, or software files for performing the techniques above, for example. The storage device 403 and the memory 402 are both examples of computer readable mediums.

In one embodiment, the computing system 410 may be coupled via the bus 406 to a display 412, such as a cathode ray tube (CRT) or liquid crystal display (LCD), for displaying information to a user. An input device 411 such as a keyboard and/or mouse is coupled to the bus 405 for communicating information and command selections from the user to the processor 401. The combination of these components allows the user to communicate with the computing system 410. In some systems, the bus 406 may be divided into multiple specialized buses.

In one embodiment, the computing system 410 includes a network interface 404 coupled with the bus 405. In one embodiment, the network interface 404 provides two-way data communications between the computing system 410 and the local network 420. In one embodiment, the network interface 404 includes a digital subscriber line (DSL) or a modem to provide data communication connection over a telephone line, for example. Another example of the network interface 404 is a local area network (LAN) card to provide a data communication connection to a compatible LAN. Wireless links are another example. In any such implementation, the network interface 404 sends and receives electrical, electromagnetic, or optical signals that carry digital data streams representing various types of information.

In one embodiment, the computing system 410 sends and receives information, including messages or other interface actions, through the network interface 404 across a local network 420, an Intranet, or the Internet 430. In one embodiment, the local network, the computing system 410 communicates with a plurality of other computer machines, such as a server 415 or a computing cloud 450. In one embodiment, the computing system 410 and server computer systems represented by the server 415 form a cloud computing network, which may be programmed with processes described herein. In the Internet example, software components or services may reside on multiple different computing systems 410 or servers 431-435 across the network. In one embodiment, the processes described above are implemented at computing cloud 450, which includes one or more servers from the servers 431-435. In one embodiment, the server 431 transmits actions or messages from one component, through the Internet 430, the local network 420, and the network interface 404 to a component of the computing system 410. In one embodiment, the software components and processes described above are implemented on any computer system and send and/or receive information across a network.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first request could be termed a second request, and, similarly, a second request could be termed a first request, without changing the meaning of the description, so long as all occurrences of the "first request" are renamed consistently and all occurrences of the "second request" are renamed consistently. The first request and the second request are both requests, but they are not the request.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What claimed is:
1. A computer-implemented method comprising:
first receiving, by a processor, a user request from a development environment to execute a debugging program in a production environment, wherein the production environment is inaccessible by the development environment;

approving, by the processor, the execution of the debugging program in the production environment by seeking,
   a first approval from a member of the development environment not having access to data stored in the production environment,
   a second approval from a member of the production environment, and
   a third approval from a customer possessing data stored in the production environment;
in response to the approving, transmitting, by the processor, a communication to the production environment to cause the debugging program to be executed in the production environment;
second receiving, by the processor, execution results associated with the debugging program from the production environment; and
forwarding, by the processor, the execution results to the development environment, wherein forwarding the execution results further comprises confirming, by the processor, that the member of the production environment has approved the forwarding of the execution results,
wherein the processor is not located in the development environment and in the production environment, and
wherein the first approval is based on a determination of whether execution of the debugging program replicates or modifies data stored in the production environment.

2. The computer-implemented method of claim 1, wherein the production environment communicates with the processor via HTTP.

3. The computer-implemented method of claim 1, wherein the processor is a proxy server.

4. The computer-implemented method of claim 1, wherein the determination is from a script checking the debugging program.

5. The computer-implemented method of claim 2, wherein the determination is from a script checking the debugging program.

6. A non-transitory computer readable storage medium comprising:
first receiving, by a processor, a user request from a development environment to execute a debugging program in a production environment, wherein the production environment is inaccessible by the development environment;
approving, by the processor, the execution of the debugging program in the production environment by seeking,
   a first approval from a member of the development environment not having access to data stored in the production environment,
   a second approval from a member of the production environment, and
   a third approval from a customer possessing data stored in the production environment;
in response to the approving, transmitting, by the processor, a communication to the production environment to cause the debugging program to be executed in the production environment;
second receiving execution results associated with the debugging program from the production environment; and
forwarding the execution results to the development environment, wherein forwarding the execution results comprises confirming that the member of the production environment has approved the forwarding of the execution results,
wherein the processor is not located in the development environment and in the production environment, and
wherein the first approval is based on a determination of whether execution of the debugging program replicates or modifies data stored in the production environment.

7. The non-transitory computer readable storage medium of claim 6, wherein the production environment communicates with the processor via HTTP.

8. The non-transitory computer readable storage medium of claim 6, wherein the processor is a proxy server.

9. The non-transitory computer-readable storage medium of claim 6, wherein the determination is from a script checking the debugging program.

10. The non-transitory computer-readable storage medium of claim 7, wherein the determination is from a script checking the debugging program.

11. A computer implemented system comprising:
one or more computer processors; and
a non-transitory computer-readable storage medium comprising instructions, that when executed, control the one or more computer processors to be configured for:
   first receiving a user request from a development environment to execute a debugging program in a production environment, wherein the production environment is inaccessible by the development environment;
   approving the execution of the debugging program in the production environment by seeking,
     a first approval from a member of the development environment not having access to data stored in the production environment,
     a second approval a member from the production environment, and
     a third approval from a customer possessing data stored in the production environment;
   in response to the approving, transmitting a communication to the production environment to cause the debugging program to be executed in the production environment;
   second receiving execution results associated with the debugging program from the production environment; and
   forwarding the execution results to the development environment, wherein forwarding the execution results comprises confirming that the member of the production environment has approved the forwarding of the execution results
wherein the one or more processors are not located in the development environment and in the production environment, and
wherein the first approval is based on a determination of whether execution of the debugging program replicates or modifies data stored in the production environment.

12. The computer implemented system of claim 11, wherein the production environment communicates with the processor via HTTP.

13. The computer-implemented system of claim 11, wherein the determination is from a script checking the debugging program.

14. The computer-implemented system of claim 12, wherein the determination is from a script checking the debugging program.

* * * * *